Patented June 21, 1932

1,864,229

UNITED STATES PATENT OFFICE

ROBERT S. BLACK, OF HIGHLAND PARK, ILLINOIS, ASSIGNOR TO PFANSTIEHL CHEMICAL COMPANY, OF WAUKEGAN, ILLINOIS, A CORPORATION OF ILLINOIS

PRODUCTION OF GALACTONIC ACID AND ITS LACTONE

No Drawing.   Application filed March 21, 1927.   Serial No. 177,209.

This invention relates to the production of galactonic acid and its lactone, and solutions thereof.

According to the invention a solution of galactan, which may suitably be an aqueous extract from the western larch, is subjected to a restricted oxidation so as to produce galactonic acid. This reaction may suitably be effected at a moderately high temperature, which assists the oxidation reaction and also aids the hydrolysis or breaking up of the complex galactan molecules. If desired, the solution may be subjected to a preliminary heating to effect some hydrolysis. When the galactonic acid stage is attained, oxidation is terminated and the solution may be further treated for conversion into the lactone. Substantial conversion may be attained at ordinary temperatures on prolonged standing but the rate of reaction is greatly accelerated by heat. The conversion is apparently an equilibrium reaction and solutions of desired ratio of acid and lactone may be obtained by evaporating to a definite degree. If the solution is completely evaporated lactone crystals precipitate.

It is preferred to employ oxidizing agents which do not yield reaction products which are difficult of removal from the solution. The halogens, chlorine, bromine and iodine are particularly suitable on account of the ease with which the excess halogens and halogen acids may be removed. Other suitable oxidizing agents may be used.

The oxidation to galactonic acid takes place satisfactorily between about 50° and 70° C., although it is to be understood that the invention is not to be considered as limited to these temperatures. The galactonic acid is preferably converted into the lactone at about the same temperature, but the reaction may be effected at lower and higher temperatures, if desired. Ordinarily the solution will require to be evaporated to a more concentrated solution or until crystals of lactone are obtained. The desired conversion may be suitably effected by evaporating at a temperature between 50° and 70° C. under vacuum.

The invention will more readily be understood from the following detailed example.

One liter of concentrated aqueous solution of galactan, derived from the extraction of the western larch of specific gravity of 1.24, is diluted with an equal volume of water, giving a solution of galactan of specific gravity at 1.12. The solution is warmed to about 60° C. and maintained at this temperature while chlorine gas is passed into the solution preferably in minute bubbles. Substantial conversion into galactonic acid is shown by the attainment of a rotation of $-30°$ to $-35°$, in a 1 dm. tube, Ventzke, and usually requires seven or eight hours at 60° C. Hydrochloric acid and excess chlorine may be removed from the product by steam or air and the remainder may be neutralized by adding a small amount of sodium bicarbonate, if there is no objection to a trace of salt in the product.

The solution may now be subjected to evaporation at a temperature of about 50° to 60° C. under a vacuum of 24 or 25 inches of mercurcy, and the operation is stopped when the desired conversion is obtained. For example, the evaporation may be stopped when a sample of the solution has a specific rotation of $-69\frac{1}{2}°$, corresponding to about 70% conversion into lactone.

The evaporation may be continued until crystals of lactone separate out.

While the invention has been described in connection with the details of a specific embodiment thereof, it is not intended that such details shall be regarded as limitations upon the scope of the invention, except in so far as included in the accompanying claims.

I claim:

1. The method of producing galactonic acid from galactan which comprises subjecting an aqueous solution of galactan to the action of a halogen while maintaining a temperature of 50° to 70° C., thereby producing galactonic acid directly.

2. The method of producing galactonic acid from galactan which comprises subjecting an aqueous solution of galactan to the action of chlorine while maintaining a temperature of 50° to 70° C., thereby producing galactonic acid directly.

3. The method of producing galactonic acid which consists in heating a solution of galactan of about 1.12 specific gravity, to about 50° to 70° C. and oxidizing the solution with chlorine until a rotation of −30° to −35° in a 1 dm. tube Ventzke is attained.

In testimony whereof, I hereunto set my hand this 18th day of March, 1927.

ROBERT S. BLACK.